Aug. 11, 1925.

J. PAISSEAU 1,549,497

MACHINE FOR VARNISHING BEADS

Filed Oct. 25, 1921      5 Sheets-Sheet 3

Inventor
Jean Paisseau
By H. B. Willson & Co.
Attorneys

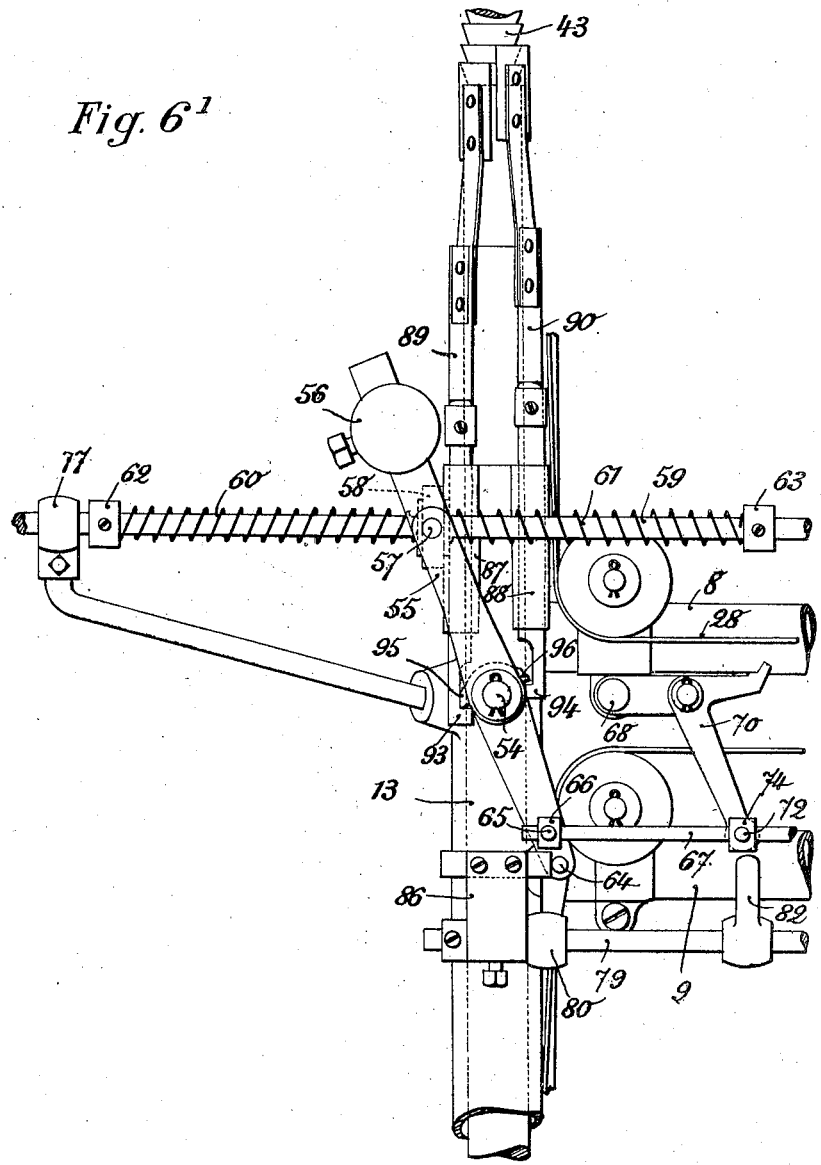

Aug. 11, 1925.
J. PAISSEAU
1,549,497
MACHINE FOR VARNISHING BEADS
Filed Oct. 25, 1921    5 Sheets-Sheet 5
Fig. 6²
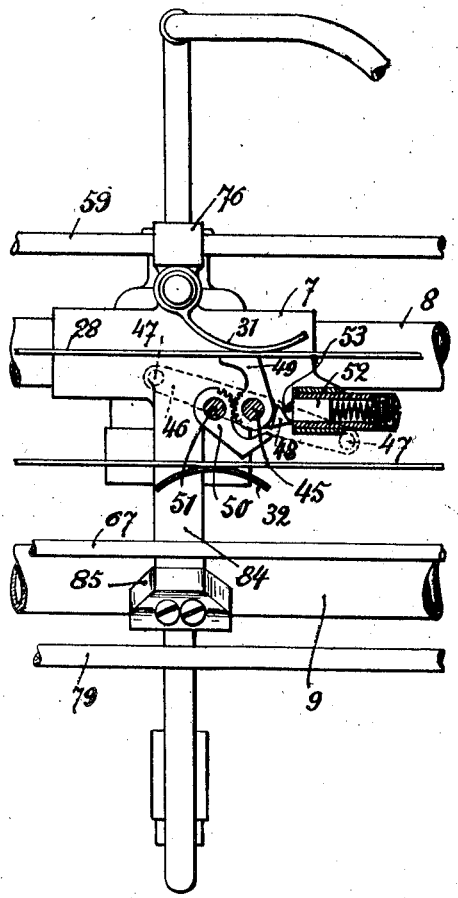
Fig. 6³
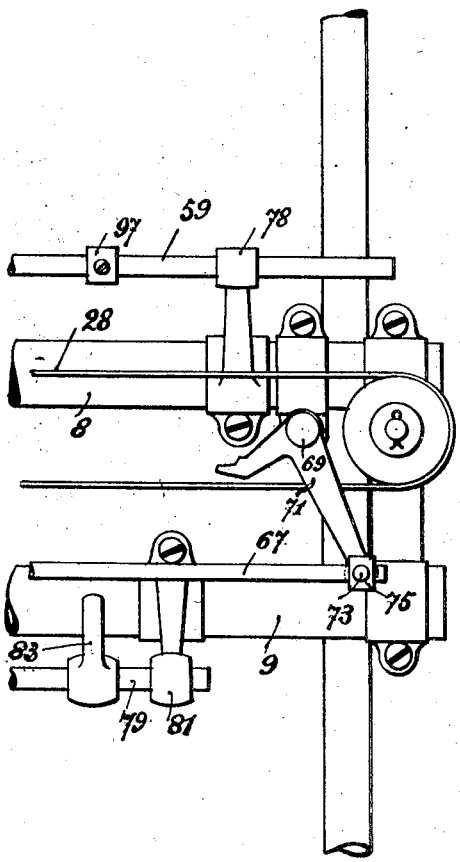
Inventor
Jean Paisseau
By H.B.Willson&co.
Attorneys Patented Aug. 11, 1925.

1,549,497

UNITED STATES PATENT OFFICE.

JEAN PAISSEAU, OF PARIS, FRANCE.

MACHINE FOR VARNISHING BEADS.

Application filed October 25, 1921. Serial No. 510,271.

*To all whom it may concern:*

Be it known that I, JEAN PAISSEAU, a citizen of the Republic of France, and residing at Paris, Seine Department, in the Republic of France, have invented certain new and useful Improvements in Machines for Varnishing Beads, of which the following is a specification.

This invention relates to a machine for applying varnish or a like coating to beads of glass or enamel in a convenient, rapid and perfectly regular manner. The said machine comprises a casing containing a plurality of supports between which the wires strung with beads are stretched horizontally, all the said supports being connected together by gearing and rotated by mechanical means. The varnish or like liquid is applied to the beads thus rotated either by a brush or by a suitable atomizer which may be moved before the portions carrying the beads either by hand or by mechanical means. In the latter case the brush or the atomizer is mounted on a carriage having a reciprocating motion upon a horizontal guide whose height is adjustable. The reciprocating motion may be automatic as well as the vertical movement of the guide.

The accompanying drawing shows by way of example a machine according to the invention.

Fig. 4 is a side elevation of the said casing.

Fig. 5 is a section on a larger scale on the line A—A Fig. 1.

Figure 1:
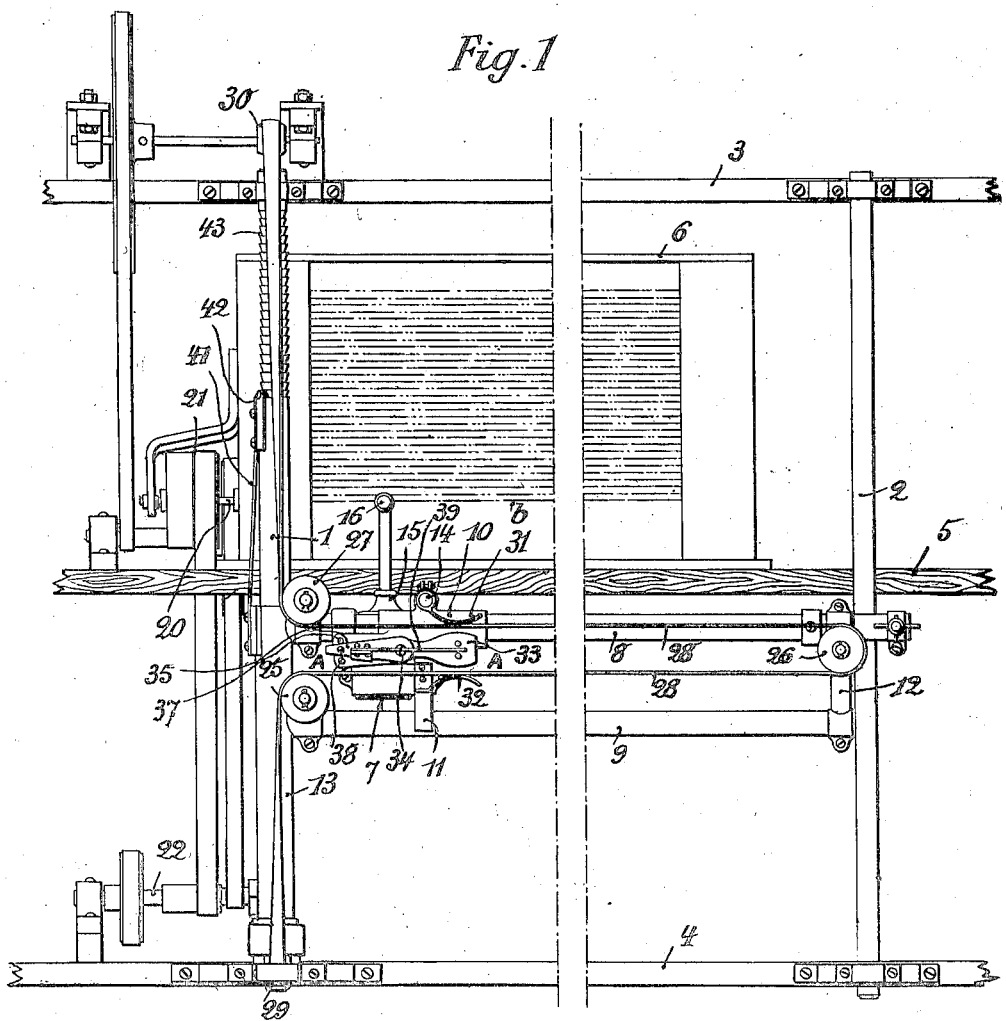
Fig. 1 is an elevational view of the whole machine.

Figs. 6¹, 6², 6³ is an elevational view of a modified form of the machine provided with automatic control device for the reciprocating motion of the carriage and the lifting of the said guide.

The machine comprises a frame composed of two uprights 1 and 2 connected by the cross-pieces 3 and 4, and a table 5 having disposed thereon a frame 6 containing the beads to be coated. A carriage 7 is slidable on the horizontal guides 8 and 9 and is provided for the purpose with a socket 10 and a fork 11. The guides 8 and 9 are connected by a cross-piece 12 and are secured to a vertical socket 13, the whole device being vertically slidable on the uprights 1 and 2. The carriage 7 has disposed thereon a support 14 whereupon is secured an atomizer 15 whose nozzle 16 is situated opposite the beads *a*.

The latter are disposed on the metal wires *b* whose ends are held by the hooks 17, 18 revolubly mounted in the uprights on the frame 6. All the hooks on the same side are connected together by the gear wheels 19 and are actuated by a shaft 20 by means of the pulleys 21. The said pulleys are driven by belting from the shaft 22 mounted at the base of the machine. The hooks 18 are longitudinally slidable upon keys cooperating with the gear wheels 19 and are acted upon by the springs 23 which serve to maintain the tension upon the said wires. The device comprising the hooks is maintained in the plate 24 constituting the walls of the uprights of the frame 6 and supporting the driving pulleys. The mechanical movement of the said carriage upon the guides 8 and 9 may be effected as follows. The said guides carry the rollers 25, 26, 27 cooperating with a belt 28 which also cooperates with the auxiliary rollers 29, 30, this latter being driven by a suitable power transmission device whereby the belt 28 shall be given a continuous movement in the same sense.

Upon the carriage 7 are secured the springs 31, 32 which are disposed respectively above and below the horizontal strands of the belt 28. Between the said springs and in the space between the two strands of the belt, is movably disposed a slide 33 pivoted to an axle 34 mounted on the carriage 7. A lever 35 is also disposed to swing upon the said axle.

The said lever carries a spring plunger 36 cooperating with the recesses 37, 38 formed in the body of the said carriage. The lever 35 also carries a plate spring 39 disposed between two studs 40 secured to the slide 33. According to the position of the said spring plug in one or the other recess, the spring 39 will press upon one or the other of the studs 40, whereby one of the two horizontal strands of the belt 28 will be jammed between the slide 33 and either one of the springs 31, 32. Whence it will result that the carriage will be driven in one or the other direction according to the case. This will provide for the movement of the said atomizer throughout the whole length of the wires carrying the beads.

At each stroke, the position of the lever 35 is to be reversed. This operation may be effected by hand or automatically by any suitable device such for instance as the devices used upon lathes or the like possessing mechanical parts for reciprocating motion. After a suitable number of movements before one of the rows of beads, the guide device 8, 9, 12, 13 is raised by an amount representing the distance between two successive rows and is maintained at this height by means of a plate spring 41 secured to the socket 13 and provided with the hook 42 engaging the teeth of the rack 43 secured to the upright 1.

Figure 2:
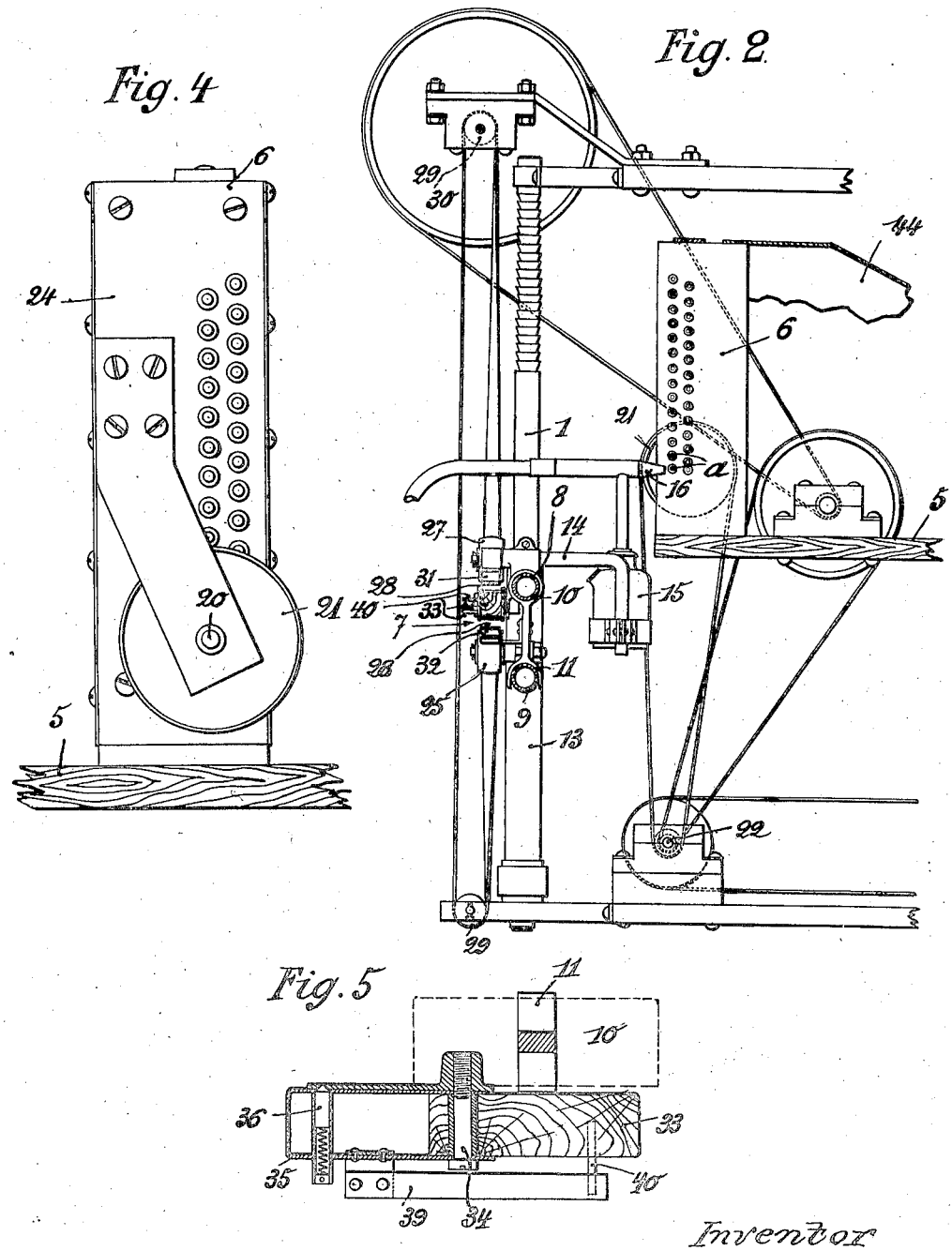
Fig. 2 is a side view of the same.
Figure 3:
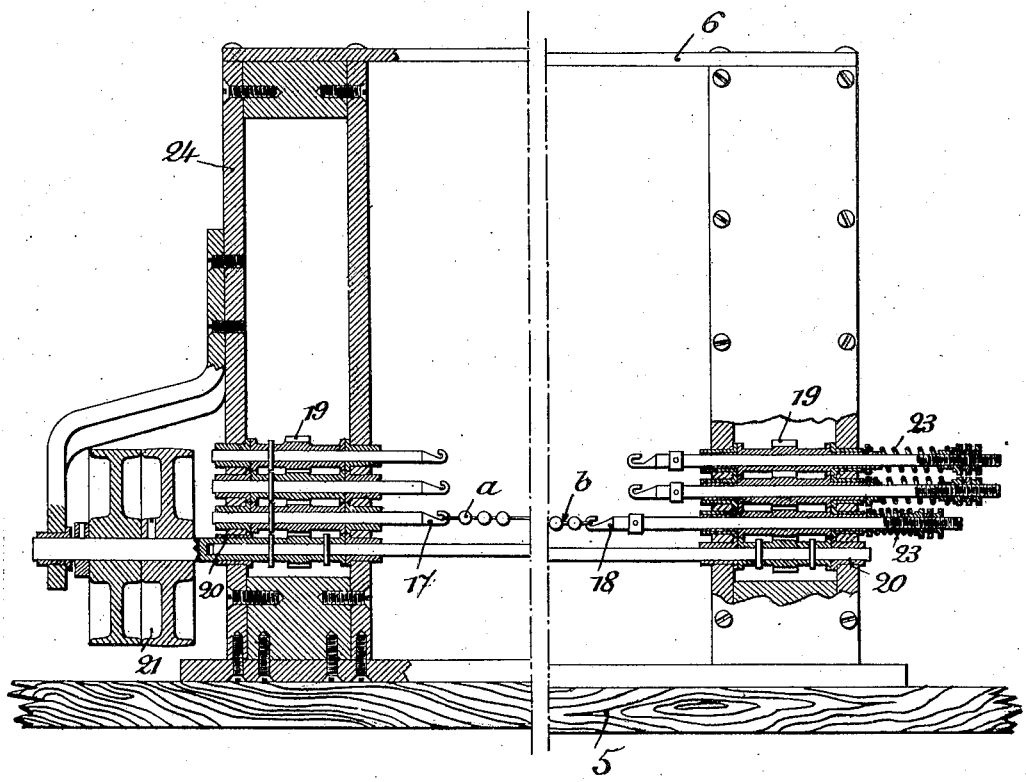
Fig. 3 is a sectional view of the casing containing the rows of beads.

The hooks 17 and 18 are preferably disposed in different planes in two vertical and parallel planes in order that the fine drops of varnish which are not stopped by the beads situated adjacent the said atomizer shall be received by the beads situated in the second plane. In order that the varnish shall be disposed with the greatest possible uniformity upon all the beads, it may be advantageous to mount the said atomizer in an adjustable manner upon the support thereof, the stream being thus sent not only in the horizontal but also in the oblique direction and alternately to the right and left. To obviate losses of the coating substance, a hopper 44 is disposed behind the frame 6, only a small part of the same being shown in Fig. 2. The said hopper is connected with an air fan which draws off all the vapors, and these may be suitably collected. The walls of the said hopper are provided with removable plates in celluloid or the like whereupon are deposited the non-volatile portions of the varnish and which are readily removed at intervals to recover the deposited substance.

As above stated, the reciprocating motion of the said carriage and the lifting of the guide may be entirely automatic. In Figs. 6', 6², and 6³, the carriage 7 is provided with an axle 45 having pivoted thereto a rocker arm 46 having at each end the studs 47. The rocker arm 46 has secured thereto a tappet 48 cut in a bevel and a finger 49 carrying a toothed quadrant. A like finger 50 carries a similar quadrant geared to to the first-mentioned quadrant, the said finger pivoting upon an axle 51 secured to the carriage 7. Opposite the end of the tappet 48 is situated the end of a spring plunger 52 which is movable in a socket secured to the carriage 7. The end of the said plunger is rounded and in the middle part thereof is formed the groove 53.

As in the preceding case, the belt 28 may be jammed between the fingers 49 or 50, and the springs 31 or 32. The socket 13 is provided with an axle 54 having mounted thereon a rocker arm 55 balanced by a counterweight 56. The said rocker arm is connected by an articulation 57 with a ring 58 which is slidable on a rod 59 between two springs 60, 61 maintained by the two stop pieces 62, 63. The lower end of the rocker arm carries the studs 64 and 65, the latter engaging the connecting member 66 secured to the rod 67. Upon the guide 8 are secured the axles 68, 69 having pivoted thereto the double-arm levers 70, 71. The lower arms of the said levers carry the studs 72, 73 whereby the said arms are caused to pivot in the connecting members 74, 75 secured to the rod 67. The upper arms are disposed in such manner as to be enabled to act upon the studs 47 of the rocker-arm 46. The rod 59 is slidable in an extension 76 of the carriage 7 and is maintained by two supports 77, 78. A rod 79 is journaled in two supports 80, 81 secured to the guide 9, and has mounted thereon the fingers 82, 83 which may be actuated by a cam 85 situated upon an extension 84 of the carriage 7. The rod 79 is connected with a locking bolt 86 against which the stud 64 of the rocker-arm 55 is caused to bear either at the right or the left hand side.

The socket 13 carries the tubes 87, 88 having slidable therein the hooks 89, 90 acted upon by springs tending to raise the same from the said socket. The said hooks engage at the upper part thereof the teeth of the rack 43, the lower part carrying the tappets 93, 94 whereupon are caused to act the teeth 95, 96 mounted on the rocker-arm 55. The rod 59 is also provided with a thrust ring 97.

The operation of the device is as follows. The position of the parts being that of Fig. 6², the belt is pressed between the finger 49 and the spring 31, and the carriage 7 moves to the right. Before the said carriage reaches the end of its stroke, the extension thereof 76 enters in contact with the ring 97 and draws along the rod 59, thereby compressing the spring 60 against the rocker-arm 55. When the carriage reaches the end of the right hand stroke, at the same time that the stud 47 moves upon the upper arm of the lever 71, the cam 85 acts upon the finger 83. The finger 83 thus driven back will effect the rotation of the rod 79 drawing with it the member 86 which thereby releases the stud 64. The rocker arm 55 will now oscillate suddenly under the action of the spring 60 and will assume a symmetrical position. By reason of this oscillation, the rod 67 is moved to the left and causes the levers 70, 71 to oscillate in the same sense.

The rocker-arm 46 is now suddenly raised by the lever 71 and will pivot about its axle 45; the tappet 48 moves to the other side of the plunger 52; the finger 42 ceases to press the belt against the spring 31 and on the contrary the finger 50 drawn by the toothed quadrants will now press the belt against the spring 32, and in consequence the reversal of motion will be produced. When the carriage is moved to the left, the cam 85 leaves the finger 83; the member 86 now resumes the first position and maintains the stud 64 in contact on the left hand side thereof. The lever 70 which has been rotated by the rod 67 is prepared to act on the left hand stud 47, and in this manner when the carriage reaches the end of the left hand stroke, the above-mentioned operation will be repeated in a symmetrical manner, the extension 76 acting on the stop-piece 63 in order to set the spring 61, and so on.

At the same time, during its successive swings, the rocker arm 55 acts by means of the teeth thereof 95, 96 upon the hooks 89, 90. It bears by the said teeth alternately upon each hook to raise the socket 15 by one notch. At each operation, the other hook which is released will rise under the action of the spring thereof and will become hooked at a point two teeth higher upon the rack 43. It is to be observed that the said devices, by reason of the action of the springs 69, 61 will produce a sudden changing over from the drive by one strand of the belt to the drive by the other strand, and there will be no apprehension that the operation will cease when at the end of the stroke. With a machine having the said automatic control, the varnish or like coating substance is projected upon the beads in the most regular manner, and the beads situated at the ends of the rows are treated in exactly the same way as the others. The manufacture is also of a very economical character.

I claim:

1. A machine for varnishing beads strung upon threads or wires, comprising revoluble hooks to which the ends of the threads or wires may be attached, two plates in which said hooks are respectively revoluble, gearing connecting the hooks mounted in both plates and means for projecting the varnish upon the beads.

2. A machine for varnishing beads strung upon threads or wires, comprising revoluble hooks to which the ends of the threads or wires may be attached, two plates in which the hooks are respectively revoluble, gear wheels disposed upon all the hooks and inter-connected throughout the entire number thereof, the hooks on one side being slidable within the respective gear wheels, springs acting upon the said slidable hooks for maintaining the tension of the said hooks or wires and means projecting the varnish upon the beads.

3. A machine for varnishing beads strung upon threads or wires, comprising revoluble hooks to which the ends of the threads or wires may be attached, two plates in which the hooks are respectively revoluble, the hooks being disposed in different planes in two vertical and parallel planes and means for projecting the varnish upon the beads.

4. A machine for varnishing beads strung upon threads or wires, comprising revoluble hooks to which the ends of the threads or wires may be attached, two plates in which the hooks are respectively revoluble, an atomizer mounted for disposition opposite the said threads or wires, a carriage having the said atomizer mounted thereon and adapted to move along the said threads or wires, a belt having both strands thereof parallel to the said threads or wires, rollers for guiding the said belt, and means for alternately connecting the said carriage with one of the strands of the said belt, the two strands moving in the contrary sense.

5. A machine for varnishing beads strung upon threads or wires, comprising revoluble hooks to which the ends of the threads or wires may be attached, two plates in which the hooks are respectively revoluble, an atomizer mounted for disposition opposite the said threads or wires, a carriage having the said atomizer mounted thereon and adapted to move along the said threads or wires, a belt having both the strands thereof parallel to the said threads or wires and moving in the contrary sense, two flat springs mounted upon the said carriage and disposed on either side of the two strands, and a shoe disposed upon the said carriage and swinging between the two strands, the said shoe being adapted to effect the jamming of either of the said strands against one of the said flat springs.

6. A machine for varnishing beads strung upon threads or wires, comprising revoluble hooks to which the ends of the threads or wires may be attached, two plates in which the hooks are respectively revoluble, an atomizer mounted for disposition opposite the said threads or wires, a carriage having the said atomizer mounted thereon and adapted to move along the said threads or wires a guide having the said carriage slidable thereon, a spring-actuated hook secured to the said carriage, and a vertical rack cooperating with the said hook whereby the said carriage may be secured at an adjustable height.

7. A machine for varnishing beads strung upon threads or wires, comprising revoluble hooks to which the ends of the threads or wires may be attached, two plates in which the hooks are respectively revoluble, a belt having both the strands thereof arranged for disposition parallel to the said threads or wires and moving in the contrary sense, two flat springs mounted upon the said carriage and disposed on either side of the two strands, to fingers adapted to swing upon the said carriage between the two strands of the belt and adapted to effect the jamming of the said strands alternately against one or the other of the said springs, the said fingers being connected together by gearing, a rocker arm secured to one of the said fingers, means for rocking the said arm at each end of the stroke of the said carriage and means for projecting the varnish upon the beads.

8. A machine for varnishing beads strung upon threads or wires, comprising revoluble hooks to which the ends of the threads or wires may be attached, two plates in which the hooks are respectively revoluble, a belt having both the strands thereof arranged for disposition parallel to the said threads or wires and moving in the contrary sense, two flat springs mounted upon the said carriage and disposed on either side of the two strands, two fingers adapted to swing upon the said carriage between the two strands of the belt and adapted to effect the jamming of the said strands alternately against one or the other of the said springs, the said fingers being connected together by gearing, a rocker arm secured to one of the said fingers, a double arm lever disposed at each end of the stroke of the said carriage, stationary axles having the two levers swinging thereupon, a rod connecting the two levers together and longitudinally movable, the upper arms of the two levers causing the said rocker arm to oscillate at each end of the stroke and means for projecting the varnish upon the beads.

9. A machine for varnishing beads strung upon threads or wires comprising two revoluble supports for each of said wires and adapted to receive the ends of the wires, two plates having the said supports revoluble therein, an atomizer disposed opposite the said wires, a carriage having the said atomizer mounted thereon and movable in the longitudinal sense, a belt whereof the two strands are parallel to the said threads or wires and are movable in the contrary sense, two flat springs mounted upon the said carriage and disposed on either side of the two strands, two fingers adapted to swing upon the said carriage between the two strands of the belt and adapted to effect the jamming of the said strands alternately against one or the other of the said springs, the two fingers being connected together by gearing, a rocker arm secured to one of the said fingers, a double arm lever disposed at each end of the stroke of the said carriage, stationary axles having the two levers swinging thereupon, a rod connecting the levers together and longitudinally moveable, a second rocker arm pivoted to the said rod, two springs acting on either side of the said rocker arm, a swinging stop-piece serving as a contact member for the said rocker arm and releasing the latter at each end of the stroke, a rod secured to the said carriage and movable together with the same, and stop-pieces disposed on the said rod and serving as contact members for the said springs, the said springs being alternately stretched by the said rod and producing the oscillation of the said rocker arm at the end of the stroke of the said carriage.

10. A machine for varnishing beads strung upon threads or wires, comprising two revoluble supports for each of said wires and adapted to receive the ends of the wires, two plates having the said supports revoluble therein, an atomizer disposed opposite the said threads or wires, a carriage having the said atomizer mounted thereon and movable in the longitudinal sense, a belt whereof the two strands are parallel to the said threads or wires and are movable in the contrary sense, two flat springs mounted upon the said carriage and disposed on either side of the two strands, two fingers adapted to swing upon the said carriage between the two strands of the belt and adapted to effect the jamming of the said strands alternately against one or the other of the said springs, the two fingers being connected together by gearing, a double-arm lever disposed at each end of the stroke of the said carriage, stationary axles having the two levers swinging thereupon, a rod connecting the two levers together and longitudinally movable, a second rocker arm pivoted to the said rod, two springs acting on each side of the said rocker arm, a swinging stop-piece serving as a contact member for the said rocker arm and releasing the latter at each end of the stroke, a pivoted rod carrying the said stop-piece and situated parallel to the guide of the said carriage, a finger disposed at each end of the stroke, and a cam disposed upon the said carriage and entering respectively in contact with the said fingers at each end of the stroke.

11. A machine for varnishing beads strung upon threads or wires, comprising two uprights having the said threads or wires disposed between the same, an atomizer disposed opposite the said threads or wires, a carriage having the said atomizer mounted thereon and movable along the said threads or wires, a guide having the said carriage slidable thereon, a cam disposed upon the said carriage, a swinging rod parallel to the guide of the said carriage, two fingers disposed at the ends of the said rod and cooperating with the said cam, a locking bolt disposed upon the said rod, a rocker arm adapted to enter in contact at both sides with the said locking bolt, means for effecting the oscillation of the said rocker arm at each end of the stroke of the said carriage, a stationary vertical rack, two spring-actuated hooks cooperating with the said rack, two stationary sockets having the said hooks slidable therein, two cams disposed upon the said rocker arm, and a tappet disposed upon each of the said hooks and cooperating with one of the said cams whereby the said carriage shall be caused to rise at each end of the stroke.

In testimony, that I claim the foregoing as my invention I have signed my name.

JEAN PAISSEAU.